Figure 1:
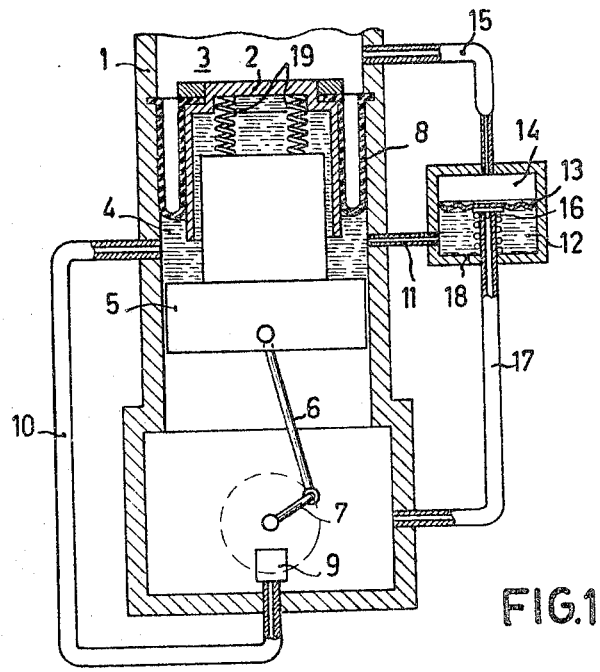

Oct. 11, 1966   J. A. RIETDIJK   3,277,795
PISTON CYLINDER MEANS WITH FLUID-COUPLED DRIVE MEANS
AND ROLLING DIAPHRAGM SEAL
Filed Sept. 30, 1964   2 Sheets-Sheet 1

INVENTOR.
JOHAN A. RIETDIJK
BY
AGENT

Oct. 11, 1966  J. A. RIETDIJK  3,277,795
PISTON CYLINDER MEANS WITH FLUID-COUPLED DRIVE MEANS
AND ROLLING DIAPHRAGM SEAL
Filed Sept. 30, 1964  2 Sheets-Sheet 2

INVENTOR.
JOHAN A. RIETDIJK
BY
AGENT

United States Patent Office 3,277,795
Patented Oct. 11, 1966

3,277,795
PISTON CYLINDER MEANS WITH FLUID-COUPLED DRIVE MEANS AND ROLLING DIAPHRAGM SEAL
Johan Adriaan Rietdijk, Emmasingel, Eindhoven, Netherlands, assignor to North American Philips Company, Inc., New York, N.Y., a corporation of Delaware
Filed Sept. 30, 1964, Ser. No. 400,441
Claims priority, application Netherlands, Oct. 25, 1963, 299,784
5 Claims. (Cl. 92—84)

The invention relates to a device comprising at least one cylinder and a piston-shaped member arranged to reciprocate in the cylinder, this piston-shaped member being capable of varying the volume of a working space, the seal between the piston-shaped member and the wall of the cylinder being in the form of a rolling diaphragm one side of which also bounds the working space and the other side of which engages a liquid, the device including means to maintain a pressure difference across the rolling diaphragm which is substantially constant at least at each stroke.

In devices of the kind to which the present invention relates it is essential firstly that during operation the rolling diaphragm is always maintained in a stretched condition and secondly that the stress in the rolling diaphragm must not become excessive since otherwise fracture will occur. Furthermore it has been found that the useful life of a rolling diaphragm is greatly increased if the pressure difference across it has a substantially constant value.

In a known device of the above-mentioned kind the said conditions promoting efficient operation of the rolling diaphragm are obtained by means of liquid supporting the diaphragm on one side. The supporting liquid is contained in a chamber which is bounded by the rolling diaphragm and by rigid parts of the walls of the relatively movable elements, the said rigid wall portions being so shaped that only by their shape the chamber remains constant on movement of the elements. This chamber is filled with such an amount of liquid that there always is a pressure difference across the rolling diaphragm.

This known construction has a limitation in that if for some reason the amount of liquid in the space under the rolling diaphragm varies or the volume of this space does not remain constant owing to dimensional inaccuracies of the rigid wall portions, the pressure difference across the rolling diaphragm and hence the stresses in this diaphragm will vary. To compensate for the variation in pressure difference the rolling diaphragm will expand, which adversely affects its useful life.

In order to obviate the afore-mentioned disadvantage the device in accordance with the invention is characterized in that the side of the piston-shaped member remote from the working space engages a liquid, this liquid engages a second piston-shaped member coupled to a driving means, the liquid engaged by the rolling diaphragm and the liquid engaged by the first-mentioned piston-shaped member being contained in the same space, resilient members acting on the first-mentioned piston-shaped member to maintain a pressure difference across this member.

If in this device, either because the control device responds too slowly or because liquid escapes, the amount of liquid in the space between the two piston-shaped members becomes greater or smaller than corresponds to the desired pressure difference across the rolling diaphragm, the rolling diaphragm will not change in length but the spacing between the piston-shaped members will be altered. Thus with substantially no variation in the length of the rolling diaphragm the correct pressure difference across this diaphragm will be maintained even in the case of rapid variations in the conditions.

In a further preferred embodiment of the device in accordance with the invention the wall of the cylinder and the piston-shaped member coupled to the driving gear are stepped at the areas of their cooperating wall portions, the parts of the resulting annular surfaces facing the rolling diaphragm having equal areas.

This ensures that the spacing between the two piston-shaped members remains constant when they move relatively to the cylinder.

In accordance with the invention the deficiency or the excess of liquid in the space under the rolling diaphragm is not compensated for by the resilience of the diaphragm but by variation in the spacing between the two piston-shaped members. Thus the invention enables the rolling diaphragm to be made of material incapable of expanding in the axial direction.

If liquid escapes from the space under a rolling diaphragm not capable of expanding in the axial direction, the full pressure prevailing in the working space will act upon the diaphragm. This may result in fracture of the diaphragm. According to the invention this is prevented by causing the piston-shaped member to be always urged against the liquid by resilient members so that the rolling diaphragm also always engages the liquid.

In devices of the kind embodying the invention it is advantageous to renew the liquid in the space under the rolling diaphragm regularly. This has the purpose of restricting to a minimum the concentration of any medium diffused through the rolling diaphragm. Therefore a liquid-supply system is connected to the space for the liquid while a regulating device is provided for discharging liquid at a rate such that the pressure difference across the rolling diaphragm remains substantially constant at least at each stroke. According to the invention this regulating device comprises at least one regulating pin connected to one of the piston-shaped members, said pin or pins opening or closing an outlet for the liquid in accordance with the spacing between the said two members. Thus the two piston-shaped members form part of the regulating device, permitting a very simple and compact construction.

In order that the invention may readily be carried into effect, embodiments thereof will now be described with reference to the accompanying drawings, in which:

FIGURES 1, 2, 3 and 4 are schematic cross-sectional views of four combinations of a piston and a cylinder.

Referring now to FIGURE 1, a piston 2 is arranged to reciprocate in a cylinder 1. One side of the piston 2 bounds a working space 3. This may be the compression space of a compressor or the compression or expansion space of a hot-gas reciprocating engine. The other side of the piston 2 engages a column of liquid 4, which column 4 engages a piston 5 connected by a connecting rod 6 to a crank 7 adapted to be driven in known manner (not shown). The seal between the piston 2 and the cylinder 1 is constituted by a rolling diaphragm 8. The liquid space 4 is connected to a regulating device which maintains the pressure difference across the rolling diaphragm 8 constant and provides a certain amount of renewal of the liquid in the space 4 to ensure that the concentration of any medium diffused through the rolling diaphragm does not become excessive. This regulating device comprises a liquid pump 9 capable of supplying liquid to the space 4 through a pipe 10. To the space 4 is also connected a pipe 11 opening into a space 12 on one side of a diaphragm 13. A space 14 on the other side of the diaphragm 13 communicates with the working space 3 through a pipe 15. The pipes 11 and 15 are such that the mean pressures produced in the spaces 4 and 3 prevail in the spaces 12 and 14 respectively. The diaphragm 13 carries a valve 16 capable of closing an outlet pipe 17. The diaphragm 13 is acted upon by a compression spring 18 which ensures the production of a predetermined desired pressure difference across this diaphragm. Obviously, regulation may alternatively be effected by means of a device of a different construction.

The piston 2 is acted upon by one or more compression springs 19 which ensure that the pressure in the liquid in the space 4 is always lower by a certain amount than the pressure in the working space 3. These springs have a comparatively level characteristic so that variation in the spacing between the piston-shaped members entails substantially no variation in the pressure difference.

If for some reason the amount of liquid discharged from the space 4 exceeds the amount of liquid supplied through the pipe 10, this does not seriously affect the rolling diaphragm 8. The compression springs 19 will only be slightly compressed so that the spacing between the pistons 2 and 5 is reduced. If at another instant a greater amount of liquid is supplied, the spacing between the pistons will return to its original value. The rolling diaphragm is substantially unaffected by these processes. It is always supported satisfactorily by the liquid and the pressure difference across it remains constant. Thus a simple and reliable protection against insufficient support of the rolling diaphragm is obtained.

From the foregoing it will be appreciated that in the construction in accordance with the invention the rolling diaphragm need not be expandable. The function fulfilled by the expandability of the rolling diaphragm is effectively taken over by the piston 2 floating on the liquid. This permits the use of a material for the rolling diaphragm which is not axially expandable.

Figure 2:
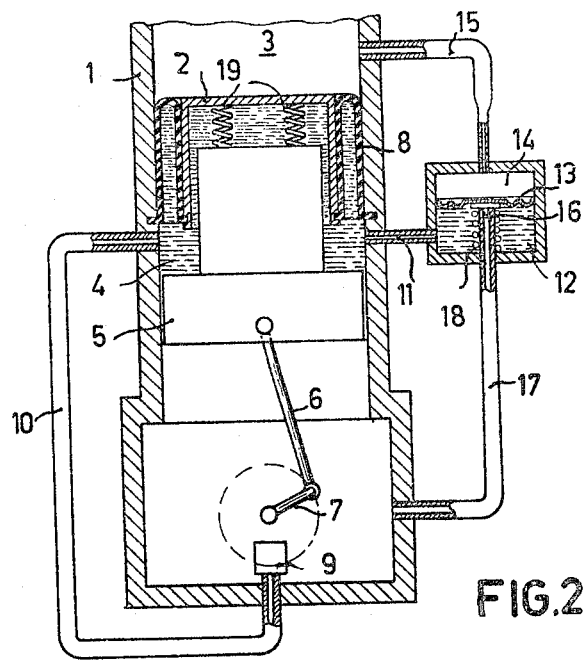

In the device of FIGURE 1 the concave side of the rolling diaphragm faces the working space 3. However, the construction in accordance with the invention is also of advantage for rolling diaphragms the convex sides of which face the working space. Such a construction is shown in FIGURE 2. In this FIGURE 2 components corresponding to those of FIGURE 1 are designated by the same reference numerals.

The difference from FIGURE 1 consists in that here the convex side of the rolling diaphragm 8 faces the working space 3. To maintain the rolling diaphragm in a stretched condition the pressure in the liquid in the space 4 must be higher than that in the working space 3. For this purpose the springs 19 now are draw springs. Otherwise operation is the same as in the device of FIGURE 1.

Figure 3:
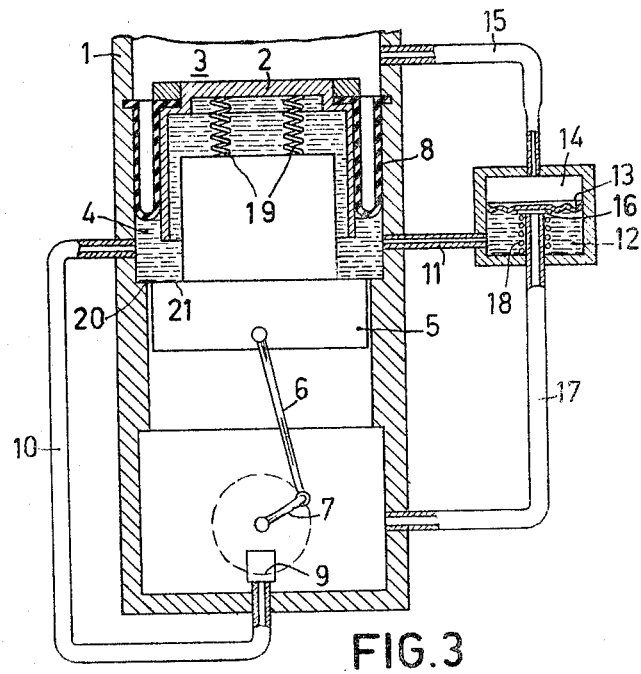

An alternative construction is shown in FIGURE 3. In this construction both the cylinder 1 and the piston 5 are stepped at the areas of their cooperating parts. The construction is such tht the resulting annular surfaces 20 and 21 are exactly equal. Consequently the changes in volume caused by movement of the annular surface 21 are exactly compensated for by the changes in volume caused by the rolling diaphragm 8. Thus the spacing between the piston-shaped members 2 and 5 remains constant in normal operation.

Figure 4:
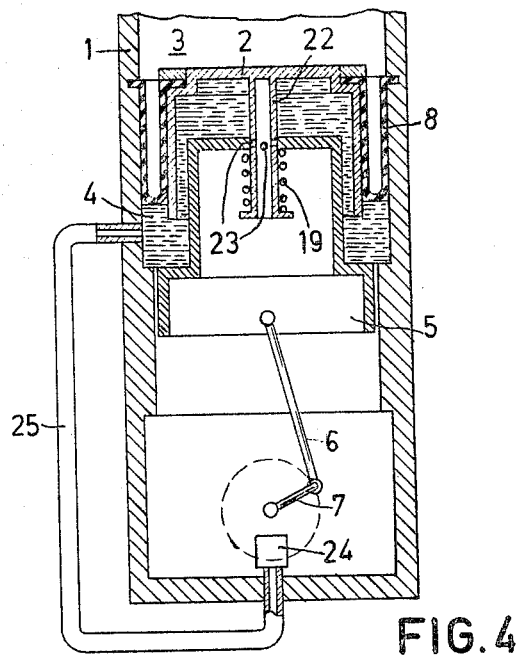

In FIGURE 4 the piston 2 is provided with a regulating pin 22. This regulating pin is hollow and its wall is provided with a number of apertures 23. Otherwise the construction differs from the constructions of the preceding figures in one point only. The spring 19, which here is in the form of a draw spring, surrounds the regulating pin 22. This provides an improved construction. The operation of the device of FIGURE 4 is as follows.

A liquid pump 24 supplies liquid to the space 4 through a pipe 25. This increases the spacing between the pistons 2 and 5. As a result of this increase, however, the apertures 23 are raised above the piston 5 so that liquid can flow back from the space 4 to the crank case. If too little liquid is supplied, the spacing between the pistons 2 and 5 decreases and the apertures 23 are colsed. This provides a reliable regulation which maintains the spacing between the pistons 2 and 5 exactly constant. Consequently the pressure difference between the media in the spaces 4 and 3 is also maintained constant.

The described regulation by a regulating pin can also be used in the devices of FIGURES 1 and 2. In these devices at each stroke the spacing between the pistons 2 and 5 is slightly changed, however, the apertures 23 in the regulating pin may be so located that they are uncovered only in the uppermost or lowermost position.

The device in accordance with the invention provides a simple construction of a piston and cylinder sealed by a rolling diaphragm in which the length of the rolling diaphragm remains substantially constant during operation, even in the case of sudden disturbances.

What is claimed is:

1. A device for compressing and expanding a medium comprising at least one cylinder, a first piston adapted to reciprocate in said cylinder and together defining a working space, said first piston when reciprocating varying the volume of said working space, a rolling diaphragm seal between said first piston and the adjacent wall of said cylinder, one side of said seal forming part of the boundary of said working space and the other side thereof engaging a column of liquid in said cylinder, means for maintaining a pressure difference across said diaphragm seal which is substantially constant during the reciprocation of said first piston in said cylinder, the side of said first piston remote from said working space engaging said liquid, a second piston in said cylinder spaced from said first piston and forming a chamber therebetween, a driving means, means coupling said second piston to said driving means, the liquid engaging said diaphragm seal and the liquid engaging said first piston being contained in said chamber, and resilient means acting on said first piston to maintain a pressure difference across said piston.

2. A device for compressing and expanding a medium as claimed in claim 1 wherein said second piston and the adjacent wall of said cylinder are stepped at their area of co-action, and the resulting annular surfaces facing said diaphragm seal form equal areas to thereby maintain a constant volume of the space under said diaphragm seal.

3. A device for compressing and expanding a medium as claimed in claim 1 wherein said diaphragm seal is constituted of a material incapable of expanding in the axial direction.

4. A device for compressing and expanding a medium as claimed in claim 1 further comprising an assembly for discharging liquid from said space under said diaphragm seal, said assembly being a regulating device for discharging liquid from said space at a rate such that a constant pressure difference is maintained across said diaphragm seal, said regulating device being provided with at least one hollow regulating pin having a liquid outlet therein and which is connected to one of said pistons and selectively opens and closes said liquid outlet dependent upon the amount of spacing between said pistons.

5. A device for compressing and expanding a medium as claimed in claim 1 wherein said resilient means are springs connected to each of said pistons.

References Cited by the Examiner

UNITED STATES PATENTS

| | | | |
|---|---|---|---|
| 949,559 | 2/1910 | Wilson | 60—54.6 |
| 1,946,715 | 2/1934 | Shield | 60—54.6 |
| 3,204,858 | 7/1965 | Dros | 92—60 X |

MARTIN P. SCHWADRON, *Primary Examiner.*

SAMUEL LEVINE, *Examiner.*

I. C. COHEN, *Assistant Examiner.*